United States Patent
Tadokoro et al.

(10) Patent No.: US 9,657,163 B2
(45) Date of Patent: May 23, 2017

(54) SHAPE RETAINING MATERIAL AND METHOD FOR PRODUCING THE SAME

(71) Applicant: SEKISUI SEIKEI, LTD., Osaka (JP)

(72) Inventors: Atsuhito Tadokoro, Osaka (JP); Shinichi Tokudome, Osaka (JP); Tomoyuki Hishida, Osaka (JP)

(73) Assignee: SEKISUI SEIKEI, LTD., Osaka (JP)

( * ) Notice: Subject to any disclaimer, the term of this patent is extended or adjusted under 35 U.S.C. 154(b) by 0 days.

(21) Appl. No.: 15/032,143

(22) PCT Filed: Feb. 26, 2015

(86) PCT No.: PCT/JP2015/055511
§ 371 (c)(1),
(2) Date: Apr. 26, 2016

(87) PCT Pub. No.: WO2016/042798
PCT Pub. Date: Mar. 24, 2016

(65) Prior Publication Data
US 2016/0257807 A1 Sep. 8, 2016

(30) Foreign Application Priority Data

Sep. 16, 2014 (JP) ................................. 2014-187349

(51) Int. Cl.
| | |
|---|---|
| C08L 23/06 | (2006.01) |
| B29C 55/06 | (2006.01) |
| B29C 55/18 | (2006.01) |
| B29K 23/00 | (2006.01) |
| B29L 7/00 | (2006.01) |

(52) U.S. Cl.
CPC .............. *C08L 23/06* (2013.01); *B29C 55/06* (2013.01); *B29C 55/18* (2013.01); *B29K 2023/065* (2013.01); *B29L 2007/002* (2013.01)

(58) Field of Classification Search
CPC .......... C08L 23/06; B29C 55/08; B29C 55/18; B29K 2023/065; B29L 2007/002
See application file for complete search history.

(56) References Cited

U.S. PATENT DOCUMENTS

| | | |
|---|---|---|
| 2008/0110559 A1 | 5/2008 | Matsuzaka et al. |
| 2010/0056727 A1* | 3/2010 | LiPiShan et al. ........ C08L 23/04 525/240 |
| 2013/0045347 A1 | 2/2013 | Kawasumi et al. |

FOREIGN PATENT DOCUMENTS

| | | |
|---|---|---|
| JP | 2000351155 A | 12/2000 |
| JP | 3582854 B2 | 10/2004 |
| JP | 2006144198 A | 6/2006 |
| JP | 3810698 B2 | 8/2006 |
| JP | 2008023907 A | 2/2008 |
| WO | WO-2011135860 A1 | 11/2011 |

OTHER PUBLICATIONS

International Search Report and Written Opinion for Application No. PCT/JP2015/055511, dated May 26, 2015.

\* cited by examiner

*Primary Examiner* — Nathan M Nutter
(74) *Attorney, Agent, or Firm* — Marshall, Gerstein & Borun LLP

(57) ABSTRACT

The present invention provides a single-layer shape retaining material which is a fibrous, band-like, or sheet-like stretched formed material comprising 100 parts by weight of a high-density polyethylene resin having a weight-average molecular weight of 100,000 to 500,000 and a density of 0.945 to 0.960 g/cm³ and 3 to 50 parts by weight of an ethylene-α-olefin copolymer obtained by copolymerizing ethylene with an α-olefin having 4 to 10 carbon atoms, the copolymer having a density of 0.935 to 0.960 g/cm³, the difference in density between the copolymer and the high-density polyethylene resin being ±0.020 g/cm³ or less and a method for producing same.

9 Claims, 1 Drawing Sheet

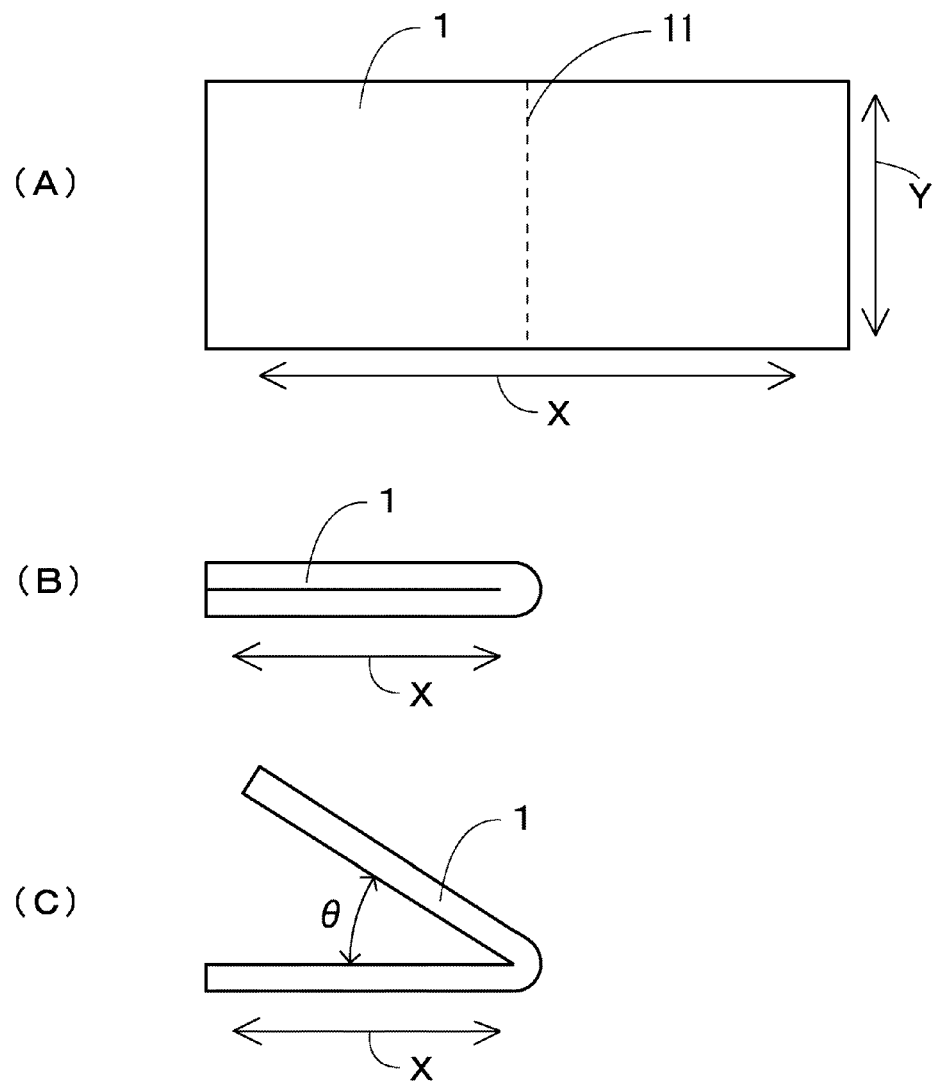

SHAPE RETAINING MATERIAL AND METHOD FOR PRODUCING THE SAME

TECHNICAL FIELD

The present invention relates to a shape retaining material comprising a polyolefin-type resin, being excellent in mechanical strength, and having shape retaining properties not only when deformed in a direction orthogonal to the stretching direction but also when deformed in a direction parallel to the stretching direction; and a method for producing the same.

BACKGROUND ART

Hitherto once a shape retaining material obtained by stretching a polyolefin-type resin sheet is bent, it does not return toward its original shape but retains the bent shape. Therefore, such shape retaining materials have conventionally been used for a binding sheet used in place of a metal wire, a core material of a hat brim, a mask, an apron, a bag, and the like.

Examples of the said shape retaining material proposed so far include "a method for producing a thread-like or band-like polyethylene material having plastic deformability, in which general-purpose polyethylene having a limiting viscosity of less than 3.5 dl/g is melted and extruded into a thread-like or band-like shape to form a raw yarn or band being made of the melt-solidified material of the polyethylene and having a maximum thickness of 1 mm or more, and the yarn or band is stretched at a temperature of 60° C. or higher and less than the melting point of polyethylene so that the resulting stretched product may have a return angle of 20 degrees or less 10 minutes after being bent at an angle of 180 degrees and a return angle of 15 degrees or less 10 minutes after being bent at an angle of 90 degrees" (see, for example, Patent Literature 1); and "a shape retaining material obtained by stretching an ethylene homopolymer or an ethylene-α-olefin copolymer containing 2% by weight or less of the α-olefin having 3 to 6 carbon atoms at a stretching ratio of 7 to 20 times, the homopolymer or copolymer having a density of 950 kg/m$^3$ or more and a ratio of weight-average molecular weight (Mw) to number-average molecular weight (Mn) of 5 to 15, the material being a fibrous or band-like formed material and having a return angle of 12 degrees or less after being bent at an angle of 90 degrees" (see, for example, Patent Literature 2). In such proposals, examples of such a "shape retaining material comprising a polyethylene resin or an ethylene-α-olefin copolymer" are shown.

However, when mechanical strength in the stretching direction (MD: machine direction) and that in TD (TD: transverse direction), i.e., in a direction orthogonal to the stretching direction are compared in the said shape retaining material, the mechanical strength in the stretching direction (MD) is high and the other is not high. That is, the material is disadvantageous in that it is likely to be torn easily when pulled in TD and that it snaps when bent along the stretching direction. Moreover, the shape retaining sheet is disadvantageous in that its shape retaining properties are not likely to be exhibited in MD while exhibited in TD.

In order to remove the above disadvantages, "a shape retaining sheet in which synthetic resin sheets each having uniaxial shape retaining properties are laminated and adhered to each other so that each uniaxial direction may form a predetermined angle with adjacent ones" (see, for example, Patent Literature 3) has been proposed.

The said shape retaining sheet can have mechanical strength nearly uniform in MD direction, TD direction, and any other direction, and be imparted with non-directional shape retaining properties. However, the said shape retaining sheet, which is constituted of a plurality of shape retaining sheets laminated and adhered to one another, is disadvantageous in that single-layer shape retaining sheets large in width are required to be prepared and that the number of manufacturing steps increases, resulting in difficult production. Moreover, well known adhesion methods, such as an adhesion method using a rubber, acrylic, urethane, or silicone adhesive or pressure-sensitive adhesive, or the like; an adhesion method using a hot-melt adhesive comprising an ethylene-vinyl acetate copolymer, a linear low-density polyethylene resin, or the like; and an adhesion method in which a low-melting-point resin, such as a linear low-density polyethylene resin, is laminated between the synthetic resin sheets, and the sheets and the low-melting-point resin are heat fused are disadvantageous in that the methods require a high cost and shape retaining properties of the resulting retaining sheet are low.

Moreover, the mechanical strengths, such as tensile elastic modulus and tensile strength, of the shape retaining material are relatively low because it is produced by stretching a resin sheet chiefly composed of a polyethylene resin. Therefore, a shape retaining material having better mechanical strengths, such as tensile elastic modulus and tensile strength, has been desired.

CITATION LIST

Patent Literature

PTL 1: JP 3582854 B
PTL 2: JP 3810698 B
PTL 3: JP 2006-144198 A

SUMMARY OF INVENTION

Technical Problem

In view of the said problems, an objective of the present invention is to provide a single-layer shape retaining material having excellent shape retaining properties in MD, TD, and any other direction and being excellent in mechanical strengths, such as anti-longitudinal tearing property, tensile elastic modulus, and tensile strength; and a method for producing the same.

Solution to Problem

That is, the present invention relates to the following.
[1] A shape retaining material, which is a fibrous, band-like, or sheet-like stretched formed material comprising 100 parts by weight of a high-density polyethylene resin having a weight-average molecular weight of 100,000 to 500,000 and a density of 0.945 to 0.960 g/cm$^3$ and 3 to 50 parts by weight of an ethylene-α-olefin copolymer obtained by copolymerizing ethylene with an α-olefin having 4 to 10 carbon atoms, the copolymer having a density of 0.935 to 0.960 g/cm$^3$, the difference in density between the copolymer and the high-density polyethylene resin being ±0.020 g/cm$^3$ or less, wherein the material shows, after being bent at an angle of 180 degrees in TD, i.e., in a direction orthogonal to the stretching direction (MD), held in the bent state for 1 minute, released, and left for 5 minutes after the release, a return angle of 15 degrees or less; and shows, after being bent at an angle of 180 degrees in MD, i.e., in a direction parallel to the stretching direction (MD), held in the bent state for 1 minute, released, and left for 5 minutes after the release, a return angle of 25 degrees or less.

[2] The shape retaining material according to the said [1], wherein the melt mass flow rate (MFR) of the high-density polyethylene resin is 0.20 to 0.60 g/10 min, the melt mass flow rate (MFR) of the ethylene-α-olefin copolymer is 0.30 to 0.70 g/10 min, and the difference in melt mass flow rate (MFR) between the ethylene-α-olefin copolymer and the high-density polyethylene resin is 0.10 g/10 min or less.

[3] The shape retaining material according to the said [1] or [2], wherein, in the stretching direction (MD), the tensile elastic modulus is 5 to 15 GPa and the tensile strength is 400 to 600 MPa.

[4] The shape retaining material according to the said [1], [2], or [3], wherein the stretched formed material further contains 7 parts by weight or less of one or more kinds of resins selected from the group consisting of linear low-density polyethylene, thermoplastic olefin elastomers, and metallocene polypropylene resins.

[5] A method for producing the shape retaining material according to the said [1], [2], or [3], comprising rolling, at a rolling ratio of 5 times or more, a linear, band-like, or sheet-like formed material comprising 100 parts by weight of a high-density polyethylene resin having a weight-average molecular weight of 100,000 to 500,000 and a density of 0.945 to 0.960 g/cm$^3$ and 3 to 50 parts by weight of an ethylene-α-olefin copolymer obtained by copolymerizing ethylene with an α-olefin having 4 to 10 carbon atoms, the copolymer having a density of 0.935 to 0.960 g/cm$^3$, the difference in density between the copolymer and the high-density polyethylene resin being ±0.020 g/cm$^3$ or less.

[6] A method for producing the shape retaining material according to the said [1], [2], or [3], comprising rolling the linear, band-like, or sheet-like formed material comprising 100 parts by weight of a high-density polyethylene resin having a weight-average molecular weight of 100,000 to 500,000 and a density of 0.945 to 0.960 g/cm$^3$ and 3 to 50 parts by weight of an ethylene-α-olefin copolymer obtained by copolymerizing ethylene with an α-olefin having 4 to 10 carbon atoms, the copolymer having a density of 0.935 to 0.960 g/cm$^3$, the difference in density between the copolymer and the high-density polyethylene resin being ±0.020 g/cm$^3$ or less, and subsequently uniaxially stretching the rolled material at a total stretching ratio of 10 to 40 times.

[7] The method for producing the shape retaining material according to the said [6], wherein the rolling ratio is 5 times or more.

[8] The method for producing the shape retaining material according to the said [6] or [7], wherein the uniaxial stretching ratio is 1.1 times or more.

Advantageous Effects of Invention

The shape retaining material of the present invention has the configuration described above and is a single-layer shape retaining material having excellent shape retaining properties in MD, TD, and any other direction and being excellent in mechanical strengths, such as anti-longitudinal tearing property, tensile elastic modulus, and tensile strength. That is, the material is not torn when pulled in TD or any other direction, nor snap not only when bent in MD but also when bent in any other direction. Moreover, the resulting shape retaining material has shape retaining properties such that the shape retaining material shows, after being bent at an angle of 180 degrees in TD, i.e., in a direction orthogonal to the stretching direction (MD), held in the bent state for 1 minute, released, and left for 5 minutes after the release, a return angle of 15 degrees or less; and shows, after being bent at an angle of 180 degrees in MD, i.e., in a direction parallel to the stretching direction (MD), held in the bent state for 1 minute, released, and left for 5 minutes after the release, a return angle of 25 degrees or less. Accordingly, the material exhibits the shape retaining properties also when bent in any other direction than MD and TD. Furthermore, the material can be easily produced at a low cost by rolling or rolling and uniaxial stretching.

BRIEF DESCRIPTION OF DRAWINGS

FIG. 1 (A) is a plan view showing an example of the shape retaining material of the present invention. FIGS. 1 (B) and 1 (C) are side views showing a method for measuring a return angle after bending in TD.

DESCRIPTION OF EMBODIMENTS

The shape retaining material of the present invention is a fibrous, band-like, or sheet-like stretched formed material comprising 100 parts by weight of a high-density polyethylene resin having a weight-average molecular weight of 100,000 to 500,000 and a density of 0.945 to 0.960 g/cm$^3$ and 3 to 50 parts by weight of an ethylene-α-olefin copolymer obtained by copolymerizing ethylene with an α-olefin having 4 to 10 carbon atoms, the copolymer having a density of 0.935 to 0.960 g/cm$^3$, the difference in density between the copolymer and the high-density polyethylene resin being ±0.020 g/cm$^3$ or less, wherein the material shows, after being bent at an angle of 180 degrees in TD, i.e., in a direction orthogonal to the stretching direction (MD), held in the bent state for 1 minute, released, and left for 5 minutes after the release, a return angle of 15 degrees or less; and shows, after being bent at an angle of 180 degrees in MD, i.e., in a direction parallel to the stretching direction (MD), held in the bent state for 1 minute, released, and left for 5 minutes after the release, a return angle of 25 degrees or less.

The high-density polyethylene resin is a polyethylene resin obtained by intermediate- or low-pressure polymerization and having a density of 0.945 to 0.960 g/cm$^3$. The high-density polyethylene resin may be obtained by polymerization with a small amount of α-olefins, such as propylene, butene-1, pentene-1, hexene-1, octene-1, and the like.

In the case where the weight-average molecular weight of the high-density polyethylene resin is less than 100,000, the resulting formed material is fragile and has lessened stretchability, and therefore, it is difficult to obtain a stretched formed material having sufficient mechanical strength or creep resistance. In contrast, in the case where the weight-average molecular weight of the high-density polyethylene resin is above 500,000, the resin has a higher melt viscosity and lessened hot-melting processability, and therefore, it is difficult to obtain a uniformly formed material. Accordingly, the weight-average molecular weight of the high-density polyethylene resin should be 100,000 to 500,000. In the present invention, the weight-average molecular weight is measured by gel permeation chromatography (GPC).

For excellent film formability, the melt mass flow rate (hereinafter referred to as "MFR") of the high-density polyethylene resin is preferably 0.1 to 20 g/10 min, more preferably 0.20 to 0.60 g/10 min, and still more preferably 0.35 to 0.45 g/10 min. MFR is an index of melt viscosity of a thermoplastic resin, specified in JIS K 7210.

In the case where the density of the high-density polyethylene resin is low, the improvement in mechanical strength as a result of stretching is small, and the shape retaining properties are also low. In the case where the density is high, the resin cannot be easily mixed with the ethylene-α olefin copolymer, and melt forming and draw forming are difficult. Accordingly, the density of the high-density polyethylene resin is preferably 0.945 to 0.960 g/cm$^3$, and more preferably 0.950 to 0.960 g/cm$^3$.

The ethylene-α-olefin copolymer is a copolymer of ethylene with an α-olefin having 4 to 10 carbon atoms, such as butene-1, pentene-1, hexene-1, octene-1, and the like. The ratio of the ethylene to the α-olefin in the ethylene-α-olefin copolymer is preferably in the range of 99.9:0.1 mol % to 90:10 mol % because the formability decreases according to the increase of the percentage of the α-olefin.

In the case where the weight-average molecular weight of the ethylene-α-olefin copolymer is less than 100,000, the resulting resin sheet is fragile and has lessened stretchability, and therefore, it is difficult to obtain a stretched high-density polyethylene resin sheet having sufficient mechanical strength or creep resistance. In contrast, in the case where the weight-average molecular weight of the ethylene-α-olefin copolymer is above 1,000,000, the copolymer has a higher melt viscosity and lessened hot-melting processability, and therefore, it is difficult to obtain a uniform sheet. Accordingly, the weight-average molecular weight of the ethylene-α-olefin copolymer is preferably 100,000 to 1,000,000. In the case where the weight-average molecular weight of a mixture of two or more kinds of α-olefin resins is measured by gel permeation chromatography (GPC), the resulting distribution may have two or more peaks. In this case, the average value is used.

For excellent film formability, the MFR of the ethylene-α-olefin copolymer is preferably 0.1 to 1.0 g/10 min, more preferably 0.30 to 0.70 g/10 min, and still more preferably 0.40 to 0.50 g/10 min.

In the case where the density of the ethylene-α-olefin copolymer is low, the improvement in mechanical strength as a result of stretching is small, and the shape retaining properties are also low. In the case where the density is high, the copolymer cannot be easily mixed with the high-density polyethylene resin, and melt forming and draw forming are difficult. Moreover, in the case where the difference in density between the high-density polyethylene resin and the ethylene-α-olefin copolymer is large, the mixing is not easy and melt forming and draw forming are difficult, and therefore, it is difficult to obtain a shape retaining material having excellent shape retaining properties. Accordingly, the density of the ethylene-α-olefin copolymer should be 0.935 to 0.960 g/cm$^3$, and the difference from that of the high-density polyethylene resin should be ±0.020 g/cm$^3$ or less.

Specific examples of the ethylene-α-olefin copolymer include, ethylene-butene-1 copolymer (Prime Polymer Co., Ltd., "NEO-ZEX (trade name)"), ethylene-hexene-1 polymer (Prime Polymer Co., Ltd., "Evolue (trade name)"), ethylene-4-methylpentene-1 copolymer (Prime Polymer Co., Ltd., "ULT-ZEX (trade name)"), and the like.

The stretched formed material is a fibrous, band-like, or sheet-like formed material having been subjected to stretching and composed of the high-density polyethylene resin and the ethylene-α-olefin copolymer. In the case where the amount of the ethylene-α-olefin copolymer added is small, the formed material has low tear strength in TD after stretching and is likely to be torn in a longitudinal direction and to snap when bent in MD. In the case where the amount is large, the formed material has low stretchability and low shape retaining properties. Accordingly, the formed material comprises 100 parts by weight of the high-density polyethylene resin and 3 to 50 parts by weight of the ethylene-α-olefin copolymer.

In the production of the stretched formed material, a high-density polyethylene resin and an ethylene-α-olefin copolymer are mixed and then melt-kneaded to form a fibrous, band-like, or sheet-like material, and therefore the difference in MFR between the resin and the copolymer is preferably small.

Accordingly, it is preferable that the MFR of the high-density polyethylene resin be 0.20 to 0.60 g/10 min, the MFR of the ethylene-α-olefin copolymer be 0.30 to 0.70 g/10 min, and the difference in MFR between the ethylene-α-olefin copolymer and the high-density polyethylene resin (the value obtained by subtracting the MFR of the high-density polyethylene resin from the MFR of the ethylene-α-olefin copolymer) be 0.10 g/10 min or less. It is more preferable that the MFR of the high-density polyethylene resin be 0.35 to 0.45 g/10 min, the MFR of the ethylene-α-olefin copolymer be 0.40 to 0.50 g/10 min, and the difference in MFR between the ethylene-α-olefin copolymer and the high-density polyethylene resin (the value obtained by subtracting the MFR of the high-density polyethylene resin from the MFR of the ethylene-α-olefin copolymer) be 0.10 g/10 min or less.

The shape retaining material (stretched formed material) has shape retaining properties such that the shape retaining material shows, after being bent at an angle of 180 degrees in TD, i.e., in a direction orthogonal to the stretching direction (MD), held in the bent state for 1 minute, released, and left for 5 minutes after the release, a return angle (hereinafter referred to as "return angle after 180 degree bending in TD") of 15 degrees or less; and shows, after being bent at an angle of 180 degrees in MD, i.e., in a direction parallel to the stretching direction (MD), held in the bent state for 1 minute, released, and left for 5 minutes after the release, a return angle (hereinafter referred to as "return angle after 180 degree bending in MD") of 25 degrees or less. Shape retaining properties mean that, after deformation, a deformed shape is retained as it is, and therefore the smaller a return angle is, the better the shape retaining properties are. The "return angle after 180 degree bending in TD" is preferably 12 degrees or less, and the "return angle after 180 degree bending in MD" is preferably 22 degrees or less.

Next, the method for measuring the "return angle after 180 degree bending in TD" is described with reference to the figures. FIG. 1 (A) is a plan view showing an example of the shape retaining material of the present invention. FIGS. 1 (B) and 1 (C) are side views showing a method for measuring a return angle after bending in TD. In the figures, 1 represents a shape retaining material, which is stretched in the direction of the arrow X. That is, the X direction is the stretching direction, or MD. The direction of the arrow Y represents TD, i.e., a direction orthogonal to the stretching direction (MD).

In the measurement of the "return angle after 180 degree bending in TD", a flat shape retaining material 1 shown in FIG. 1 (A) is folded in two along the dotted line 11, or in TD, i.e., in a direction orthogonal to the stretching direction (MD) so that two layers are overlapped (bent at an angle of 180 degrees), as shown in FIG. 1 (B). After the two layers are overlapped, the material is held in the bent state for 1 minute and then released. As shown in FIG. 1 (C), the folded shape retaining material acts so that it may return toward its original shape. The angle θ formed by the two layers at the time when 5 minutes has passed after the release (angle resulting from the behavior of the material returning toward its original shape after 180 degree bending) is measured. This angle θ is the "return angle after 180 degree bending in TD".

In the method for measuring the "return angle after 180 degree bending in MD", a flat shape retaining material is folded in two in MD, i.e., in a direction parallel to the stretching direction (MD) so that two layers are overlapped (bent at an angle of 180 degrees). After the two layers are overlapped, the material is held in the bent state for 1 minute and released. The overlapped shape retaining material acts so that it may return toward its original shape. The angle formed by the two layers at the time when 5 minutes has passed after the release (angle resulting from the behavior of the material returning toward its original shape after 180 degree bending) is measured. This angle θ is the "return angle after 180 degree bending in MD".

It is preferable that the material show, after being bent at an angle of 90 degrees in TD, i.e., in a direction orthogonal to the stretching direction (MD), held in the bent state for 1 minute, released, and left for 5 minutes after the release, a return angle (hereinafter referred to as "return angle after 90 degree bending in TD") of 15 degrees or less; and show, after being bent at an angle of 90 degrees in MD, i.e., in a direction parallel to the stretching direction (MD), held in the bent state for 1 minute, released, and left for 5 minutes after the release, a return angle (hereinafter referred to as "return angle after 90 degree bending in MD") of 40 degrees or less.

The method for measuring the "return angle after 90 degree bending" is the same as that of the "return angle after 180 degree bending", except that the material is bent at an angle of 90 degrees. That is, in the method for measuring the "return angle after 90 degree bending in TD", a flat shape retaining material is bent at an angle of 90 degrees in TD, i.e., in a direction orthogonal to the stretching direction (MD), held in the bent state for 1 minute and then released. The shape retaining material acts so that it may return toward its original shape. The angle formed by the folded material at the time when 5 minutes has passed after the release is measured. An angle obtained by subtracting 90 degrees from the measured angle (angle resulting from the behavior of the material returning toward its original shape after 90 degree bending) is used as the "return angle after 90 degree bending in TD".

In the method for measuring the "return angle after 90 degree bending in MD", a flat shape retaining material is bent at an angle of 90 degrees in MD, i.e., in a direction parallel to the stretching direction (MD), held in the bent state for 1 minute and then released. The shape retaining material acts so that it may return toward its original shape. The angle formed by the folded material at the time when 5 minutes has passed after the release is measured. An angle obtained by subtracting 90 degrees from the measured angle (angle resulting from the behavior of the material returning toward its original shape after 90 degree bending) is used as the "return angle after 90 degree bending in MD".

It is preferable that the mechanical strengths of the shape retaining material (stretched formed material) be high. The tensile elastic modulus is preferably 5 to 15 GPa, and the tensile strength is preferably 400 to 600 MPa in the stretching direction (MD).

Moreover, to impart flexibility, pliability and the like to a shape retaining material for the prevention of longitudinal tearing therein, the stretched formed material may contain one or more kinds of resins selected from the group consisting of linear low-density polyethylene, thermoplastic olefin elastomers, and metallocene polypropylene resins. However, with the increase of the content thereof, the return angle after bending becomes large and the shape retaining properties are lowered, and therefore the content is preferably 7 parts by weight or less.

The thermoplastic olefin elastomer may be any conventionally known thermoplastic olefin elastomer, and examples thereof include segments of a mixture of a polypropylene resin and an ethylene-propylene copolymer or its crosslinked product, a mixture of a polyethylene resin and an ethylene-propylene copolymer or its crosslinked product, a mixture of a polypropylene resin and an ethylene-propylene-nonconjugated polyene copolymer or its crosslinked product, a mixture of a polyethylene resin and an ethylene-propylene-nonconjugated polyene copolymer or its crosslinked product, a mixture of a polypropylene resin and a hydrogenated material of styrene-butadiene block copolymer (SEBS) or its crosslinked product, a mixture of a polypropylene resin and an ethylene-octene-1 copolymer or its crosslinked product, a mixture of a polyethylene resin and an ethylene-octene-1 copolymer or its crosslinked product, etc.

Examples of commercially available thermoplastic olefin elastomers include "DYNARON (trade name)" manufactured by JSR, "MILASTOMER (trade name)" manufactured by Mitsui Chemicals, Inc., "ESPOLEX TPE (trade name)" manufactured by Sumitomo Chemical Company, Limited, "THERMORUN (trade name)" and "ZELAS (trade name)" manufactured by Mitsubishi Chemical Corporation, and the like.

The metallocene polypropylene resin is a polypropylene resin obtained by polymerization using a metallocene catalyst, or an ethylene-propylene copolymer obtained by copolymerization of propylene with a small amount of ethylene using a metallocene catalyst. The metallocene polypropylene resin is a resin containing little low-molecular-weight substance and little low-crystalline component and having a narrow crystallinity distribution and a narrow molecular weight distribution. In particular, an ethylene-propylene copolymer has an ultra low-melting point. Specific examples of the metallocene polypropylene resin include "WINTEC (trade name)" and "WELNEX (trade name)" manufactured by Japan Polypropylene Corporation, and the like.

The production method of the fibrous, band-like, or sheet-like formed material is not particularly limited and any conventionally known production method may be used. Examples thereof include an extrusion method, an inflation method, a casting method, a T-die extruding method, a calendar method, and the like.

A fibrous, band-like, or sheet-like stretched formed material is produced by stretching the fibrous, band-like, or sheet-like formed material. Any conventionally known stretching method may be used and examples thereof include a method using rolling and a method using rolling and uniaxial stretching in combination.

The method for producing the shape retaining material of the present invention comprises rolling, at a rolling ratio of 5 times or more, a linear, band-like, or sheet-like formed material comprising 100 parts by weight of a high-density polyethylene resin having a weight-average molecular weight of 100,000 to 500,000 and a density of 0.945 to 0.960 g/cm$^3$ and 3 to 50 parts by weight of an ethylene-α-olefin copolymer obtained by copolymerizing ethylene with an α-olefin having 4 to 10 carbon atoms, the copolymer having a density of 0.935 to 0.960 g/cm$^3$, the difference in density between the copolymer and the high-density polyethylene resin being ±0.020 g/cm³ or less.

The diameter or thickness of the linear, band-like, or sheet-like formed material before rolling is not particularly limited. However, in the case where the formed material has too large a diameter or thickness, high pressure and great take-up force are required for pressing the formed material and it may be difficult to roll the formed material uniformly in the width direction due to deflection in the rolling roll, or the like. In contrast, in the case where the formed material has too small a thickness, the diameter or thickness of the formed material after rolling becomes too small. In this case, uniform rolling cannot be easily achieved, and in addition, contact between rolling rolls may shorten the roll life. Accordingly, the diameter or thickness is preferably 0.2 to 15.0 mm.

In the case where the rolling temperature is low, the formed material cannot be rolled uniformly, and in the case where the temperature is high, the formed material is melted and cut. Accordingly, the roll temperature in the rolling is preferably in the range of "the melting point-40° C." to the melting point of the high-density polyethylene resin in the formed material to be rolled, and more preferably in the range of "the melting point-30° C." to "the melting point-5° C." of the high-density polyethylene resin. In the present invention, a melting point means the maximum point of an endothermic peak observed as a result of crystal melting in a thermal analysis using a differential scanning calorimetry (DSC).

In the case where the pressure (linear pressure) applied to the formed material with rolling rolls is too low, the predetermined rolling ratio may not be achieved. In contrast, in the case where the pressure is too high, in addition to generation of deflection in the rolling rolls, slippage is likely to occur between the rolling rolls and the formed material, which may result in difficulty in rolling the formed material uniformly. Accordingly, the pressure is preferably 100 to 3000 MPa and more preferably 300 to 1000 MPa.

In the case where the rolling ratio is less than 5 times, sufficient shape retaining properties cannot be imparted, and therefore the ratio is 5 times or more, preferably 7 times or more, and more preferably 9 times or more. The rolling ratio does not have an upper limit, but the higher the ratio is, the heavier the burdens on the rolling apparatus are. Accordingly, the ratio is preferably 20 times or less. The rolling ratio is defined by "the cross-section area of the formed material before rolling"/"the cross-section area of the formed material after rolling". Since the width of the formed material is hardly changed by the rolling, the rolling ration may also be defined by "the thickness of the formed material before rolling"/"the thickness of the formed material after rolling".

The method for producing the shape retaining material of the present invention comprises rolling the linear, band-like, or sheet-like formed material comprising 100 parts by weight of a high-density polyethylene resin having a weight-average molecular weight of 100,000 to 500,000 and a density of 0.945 to 0.960 g/cm³ and 3 to 50 parts by weight of an ethylene-α-olefin copolymer obtained by copolymerizing ethylene with an α-olefin having 4 to 10 carbon atoms, the copolymer having a density of 0.935 to 0.960 g/cm³, the difference in density between the copolymer and the high-density polyethylene resin being ±0.020 g/cm³ or less, and subsequently uniaxially stretching the rolled material at a total stretching ratio of 10 to 40 times.

The diameter or thickness of the linear, band-like, or sheet-like formed material before rolling is not particularly limited. However, in the case where the formed material has too large a diameter or thickness, it is difficult to roll and stretch the formed material. In contrast, in the case where the formed material has too small a diameter or thickness, the diameter or thickness of the formed material after rolling and stretching becomes too small, resulting in reduction in shape retaining properties. Accordingly, the diameter or thickness is desirably 0.2 to 15.0 mm.

In the method for producing the shape retaining material, a linear, band-like, or sheet-like formed material is rolled and then uniaxially stretched at a total stretching ratio of 10 to 40 times. The rolling method is as described above.

In the case where the rolling ratio is less than 5 times, the effect of suppressing necking in uniaxial stretching performed later cannot be obtained and uniaxial stretching cannot be performed at a high ratio, which imposes burdens on the uniaxial stretching step. Accordingly, the rolling ratio is preferably 5 times or more, and more preferably 7 times or more. The rolling ratio does not have an upper limit, but the higher the ratio is, the heavier burdens imposed on the rolling apparatus are. Therefore, the ratio is preferably 11 times or less.

Any conventionally known uniaxial stretching method may be used and examples thereof include a uniaxial roll-stretching method and a uniaxial zone-stretching method, in which uniaxial stretching is performed under heating using a heater or hot air. In the case of a high degree of stretching, preferred is a multistage uniaxial stretching method in which uniaxial stretching is performed multiple times. In the multistage uniaxial stretching, stretching is performed preferably 2 to 20 times, more preferably 3 to 15 times, and still more preferably 4 to 10 times.

Moreover, in the case where multistage stretching is performed by a uniaxial roll-stretching method, feed pinch rolls, take-up pinch rolls, and at least one, preferably multiple contact rolls, which rotate at a constant rate between the feed pinch rolls and the take-up pinch rolls, are preferably disposed. Such contact rolls enable more uniform stretching and accordingly stable stretching.

The contact roll not pinching the formed material applies frictional force to the formed material to perform uniaxial stretching. The contact roll may be connected to a feed roll and/or a take-up roll via a gear, a chain, a pulley, a belt, or a connecting member comprising a combination thereof.

In the case where the temperature for uniaxial stretching is low, the formed material cannot be rolled uniformly, and in the case where the temperature is high, the formed material is melted and cut. Accordingly, the temperature for uniaxial stretching is preferably in the range of "the melting point-60° C." to the melting point of the high-density polyethylene resin in the formed material to be stretched, and more preferably in the range of "the melting point-50° C." to "the melting point-5° C." of the high-density polyethylene resin.

The uniaxial stretching ratio may be determined so that the total stretching ratio be within the range of 10 to 40 times taking the rolling ratio into consideration. However, in the case where the uniaxial stretching ratio is law, the mechanical strength is not improved, and therefore the ratio is preferably 1.1 times or more, and more preferably 1.3 times or more. The uniaxial stretching ratio does not have a particular upper limit, but is preferably 4 times or less, and more preferably 3 times or less. The total stretching ratio is a value obtained by multiplying the rolling ratio by the uniaxial stretching ratio.

For improved dimensional stability of the shape retaining material obtained in the production method described above, annealing may be performed at "the melting point-60° C." to the melting point of the high-density polyethylene resin. In the case where the annealing temperature is low, the dimensional stability cannot be improved and warpage is generated after long time use, and in the case where the temperature is high, the high-density polyethylene resin melts and loses its orientation, resulting in decrease in tensile elastic modulus and tensile strength. Accordingly, annealing is performed preferably at "the melting point-60° C." to the melting point of the high-density polyethylene resin.

Annealing is a heat treatment performed in a production line. In annealing, a shape retaining sheet under a high tension is stretched, and a shape retaining sheet under no or slight tension contracts. Accordingly, it is preferable that annealing be performed so that the length of the shape retaining material in the stretching direction may not vary substantially, and also that no pressure be applied to the shape retaining material. That is, it is preferable that annealing be performed so that the ratio of the length of the shape retaining material after annealing to that before annealing may be 1.0 or less.

Accordingly, in the case where the shape retaining material is continuously annealed while conveyed in a heating chamber via rolls, such as pinch rolls, it is preferable that the ratio of the feeding speed at the exit to that at the entrance be set at 1.0 or less.

The heating method for annealing is not particularly limited, and examples thereof include a heating method using hot air, a heater, a heating plate, hot water, and the like. The annealing time is not particularly limited, but varies according to the diameter or thickness of the stretched shape retaining material and annealing temperature. In general, the time is preferably 10 seconds or more, more preferably 30 seconds to 60 minutes, and still more preferably 1 to 20 minutes.

The annealed shape retaining material may further be subjected to aging in a temperature range of 40° C. to the melting point of the high-density polyethylene resin. Aging results in better dimensional stability of the annealed shape retaining material.

Aging is not a treatment performed continuously in a production line but a heat treatment performed while a sheet-like material, a rolled material, or the like obtained by processing a shape retaining material is left to stand for a relatively long time period (in minutes or hours). In the case where the aging temperature is low, the material is in almost the same state as that of being left at a room temperature, and in the case where the temperature is high, the material is thermally deformed. Accordingly, the temperature should be in the range of 40° C. to the melting point of the high-density polyethylene resin. In the case where the aging time is short, no effect can be obtained, and in the case where the time is excessively long, the increase in the effect is limited. Accordingly, the time is preferably 12 hours to 7 days.

To the shape retaining material, a heat stabilizer, a heat resistance-improver, a light stabilizer, an ultraviolet absorber, an antioxidant, an antistatic agent, an impact modifier, an antifogging agent, a flame retardant, a colorant, and the like may be added as required.

The diameter and thickness of the shape retaining material are not particularly limited, but in the case where they are small, the shape retaining properties are low. Accordingly, they are preferably 0.04 to 2 mm.

EXAMPLES

Next, the examples of the present invention will be described, but the present invention is not limited to them.

Examples 1 to 19

The resin composite composed of the predetermined amounts, shown in Tables 1 to 3, of high-density polyethylene resins, ethylene-α-olefin copolymers, a linear low-density polyethylene, a thermoplastic olefin elastomer, and a metallocene polypropylene resin was supplied to a same-direction twin-axis screw kneading extruder (manufactured by Research Laboratory of Plastics Technology Co., Ltd.) and melt kneaded at a resin temperature of 200° C. Then, the resulting melt-kneaded material was formed into a sheet using a calender machine with the roll temperature controlled to be 110° C. to give a sheet-like formed material having a thickness of 5.0 mm.

The physical properties of the high-density polyethylene resins, the ethylene-α-olefin copolymers, the linear low-density polyethylene, the thermoplastic olefin elastomer, and the metallocene polypropylene resin used are as follows.
High-density polyethylene resin 1; "NOVATEC HD" manufactured by Japan Polyethylene Corporation, weight-average molecular weight: 330,000, MFR: 0.40 g/10 min, density: 0.956 g/cm$^3$, melting point: 133° C.
High-density polyethylene resin 2; "HI-ZEX" manufactured by Prime Polymer Co., Ltd., weight-average molecular weight: 330,000, MFR: 0.37 g/10 min, density: 0.955 g/cm$^3$, melting point: 132° C.
Copolymer 1; "Evolue H" manufactured by Prime Polymer Co., Ltd., ethylene-hexene-1 copolymer, MFR: 0.45 g/10 min, density: 0.957 g/cm$^3$, melting point: 133° C.
Copolymer 2; "Evolue H" manufactured by Prime Polymer Co., Ltd., ethylene-hexene-1 copolymer, MFR: 0.45 g/10 min, density: 0.940 g/cm$^3$, melting point: 127° C.
Copolymer 3; "Evolue H" manufactured by Prime Polymer Co., Ltd., ethylene-hexene-1 copolymer, MFR: 0.40 g/10 min, density: 0.944 g/cm$^3$, melting point: 128° C.
LLDPE; a linear low-density polyethylene, "NOVATEC LL" manufactured by Japan Polyethylene Corporation, MFR: 2.1 g/10 min, density: 0.920 g/cm$^3$, melting point: 123° C.
Elastomer; a thermoplastic olefin elastomer (ethylene-ethylene-butylene-ethylene block copolymer), "DYNARON" manufactured by JSR, MFR: 2.5 g/10 min, density: 0.880 g/cm$^3$
PP; a metallocene polypropylene resin ("WINTEC (trade name)" manufactured by Japan Polypropylene Corporation)

The obtained formed material was rolled at the rolling ratio shown in Tables 1 to 3 with a rolling machine (manufactured by Sekisui Machinery Co., Ltd.) heated to 125° C. to give a rolled formed material. The obtained rolled formed material was subjected to uniaxial multistage stretching at the stretching ratio shown in Tables 1 to 3 with a multistage stretching machine using a hot-air heating method (manufactured by KYOWA ENGINEERING CO., LTD) heated to 110° C., to give a stretched formed material having the total stretching ratio shown in Tables 1 to 3. The thickness of the obtained stretched formed material obtained is shown in Tables 1 to 3.

The obtained stretched formed material was supplied, at a feeding speed of 2.75 m/min at the entrance, to a hot air heating chamber having a line length of 19.25 m, equipped with pinch rolls and set to a temperature of 125° C., at a feeding speed of 2.75 m/min at the exit, for primary annealing for 7 minutes. Subsequently, secondary annealing was performed in a similar manner to that of the primary annealing to give an annealed stretched formed material. Then, the material was supplied to a thermostatic bath at a temperature of 60° C. and subjected to aging for 24 hours to give a shape retaining material of the present invention.

A 10 mm (width)×15 cm (length) piece was cut out from the obtained shape retaining material and supplied to a Tensilon universal testing machine ("RTC-1250A" manufactured by ORIENTEC Co., LTD). The tensile test was performed in the stretching direction (MD) and the direction orthogonal to the stretching direction (TD) at a tensile speed of 100 mm/min for measurement of the tensile elastic modulus, tensile strength, and elongation rate at break. The results are shown in Tables 1 to 3.

A 10 mm (width)×15 cm (length) piece was cut out from the obtained shape retaining material, bent at an angle of 180 or 90 degrees in TD, i.e., in a direction orthogonal to the stretching direction, held in the bent state for 1 minute, released, and left for 5 minutes after the release, and then, the return angle was measured. Moreover, the material piece was bent at an angle of 180 or 90 degrees in MD, i.e., in a direction parallel to the stretching direction, held in the bent state for 1 minute, released, and left for 5 minutes after the release, and then, the return angle was measured. The results are shown in Tables 1 to 3. Even when the material piece was bent parallel to the stretching direction at an angle of 180 degrees, it did not snap.

Example 20

The resin composite composed of the predetermined amounts, shown in Table 3, of a high-density polyethylene resin, and an ethylene-α-olefin copolymer was supplied to a same-direction twin-axis screw kneading extruder (manufactured by Research Laboratory of Plastics Technology Co., Ltd.) and melt kneaded at a resin temperature of 200° C. Then, the resulting melt-kneaded material was formed into a sheet using a calendar machine with the roll temperature controlled to be 110° C. to give a sheet-like formed material having a thickness of 5.0 mm.

The obtained formed material was rolled at the rolling ratio of 9.5 times with a rolling machine (manufactured by Sekisui Machinery Co., Ltd.) heated to 125° C. to give a rolled formed material having a thickness of 0.41 mm. The obtained rolled formed material was supplied, at a feeding speed of 2.75 m/min at the entrance, to a hot air heating chamber having a line length of 19.25 m, equipped with pinch rolls and set to a temperature of 125° C., at a feeding speed of 2.75 m/min at the exit, for primary annealing for 7 minutes. Subsequently, secondary annealing was performed in a similar manner to that of the primary annealing to give an annealed rolled formed material. Then, the material was supplied to a thermostatic bath at a temperature of 60° C. and subjected to aging for 24 hours to give a shape retaining material of the present invention.

A 10 mm (width)×15 cm (length) piece was cut out from the obtained shape retaining material and supplied to a Tensilon universal testing machine ("RTC-1250A" manufactured by ORIENTEC Co., LTD). The tensile test was performed in the stretching direction (MD) and the direction orthogonal to the stretching direction (TD) at a tensile speed of 100 mm/min for measurement of the tensile elastic modulus, tensile strength, and elongation rate at break. The results are shown in Table 3.

A 10 mm (width)×15 cm (length) piece was cut out from the obtained shape retaining material, bent at an angle of 180 or 90 degrees in TD, i.e., in a direction orthogonal to the stretching direction, held in the bent state for 1 minute, released, and left for 5 minutes after the release, and then, the return angle was measured. Moreover, the material piece was bent at an angle of 180 or 90 degrees in MD, i.e., in a direction parallel to the stretching direction, held in the bent state for 1 minute, released, and left for 5 minutes after the release, and then, the return angle was measured. The results are shown in Table 3. Even when the material piece was bent parallel to the stretching direction at an angle of 180 degrees, it did not snap.

Comparative Examples 1 to 4

The high-density polyethylene resin shown in Table 4 was supplied to a same-direction twin-axis screw kneading extruder (manufactured by Research Laboratory of Plastics Technology Co., Ltd.) and melt kneaded at a resin temperature of 200° C. Then, the resulting melt-kneaded material was formed into a sheet using a calender machine with the roll temperature controlled to be 110° C. to give a high-density polyethylene resin sheet having a thickness of 4.0 mm.

The obtained high-density polyethylene resin sheet was rolled at the rolling ratio shown in Table 4 with a rolling machine (manufactured by Sekisui Machinery Co., Ltd.) heated to 125° C. to give a rolled high-density polyethylene resin sheet (Comparative Examples 1 and 3). Separately, the obtained high-density polyethylene resin sheet was rolled at the rolling ratio shown in Table 4 with a rolling machine (manufactured by Sekisui Machinery Co., Ltd.) heated to 125° C. to give a rolled high-density polyethylene resin sheet. The obtained rolled high-density polyethylene resin sheet was subjected to uniaxial multistage stretching at the stretching ratio shown in Table 4 with a multistage stretching machine using a hot-air heating method (manufactured by KYOWA ENGINEERING CO., LTD) heated to 110° C., to give a stretched high-density polyethylene resin sheet having the total stretching ratio shown in Table 4 (Comparative Examples 2 and 4). The thicknesses of the obtained rolled high-density polyethylene resin sheet and the stretched high-density polyethylene resin are shown in Table 4.

The obtained rolled high-density polyethylene resin sheet and stretched high-density polyethylene resin sheet were supplied, at a feeding speed of 2.75 m/min at the entrance, to a hot air heating chamber having a line length of 19.25 m, equipped with pinch rolls and set to a temperature of 125° C., at a feeding speed of 2.75 m/min at the exit, for primary annealing for 7 minutes. Subsequently, secondary annealing was performed in a similar manner to that of the primary annealing to give an annealed rolled high-density polyethylene resin sheet and a stretched high-density polyethylene resin sheet. Then, the materials were supplied to a thermostatic bath at a temperature of 60° C. and subjected to aging for 24 hours to give a shape retaining sheet.

A 10 mm (width)×15 cm (length) piece was cut out from the obtained shape retaining sheet and supplied to a Tensilon universal testing machine ("RTC-1250A" manufactured by ORIENTEC Co., LTD). The tensile test was performed in the rolling/stretching direction (MD) and the direction orthogonal to the rolling/stretching direction (TD) at a tensile speed of 100 mm/min for measurement of the elastic modulus, tensile strength, and elongation at break. The results are shown in Table 4.

A 10 mm (width)×15 cm (length) piece was cut out from the obtained shape retaining sheet, bent orthogonally to the rolling/stretching direction at an angle of 180 or 90 degrees, held in the bent state for 1 minute, released, and left for 5 minutes after the release, and then, the return angle θ was measured. The results are shown in Table 4. In Comparative Examples 2 and 4, when the sheet was bent parallel to the stretching direction at an angle of 180 or 90 degrees, it snapped and the measurement of the return angle could not be conducted.

TABLE 1

|  |  | Example | | | | | | |
|---|---|---|---|---|---|---|---|---|
|  |  | 1 | 2 | 3 | 4 | 5 | 6 | 7 |
| Amount of olefin resin | High-density polyethylene resin 1 | 100 | 100 | 100 | 100 | 100 | 100 | 100 |
|  | High-density polyethylene resin 2 | — | — | — | — | — | — | — |
|  | Copolymer 1 | 10 | 20 | 25 | 40 | — | 20 | 20 |
|  | Copolymer 2 | — | — | — | — | 10 | — | — |
| Rolling ratio (times) |  | 9.9 | 9.0 | 9.9 | 10.0 | 9.5 | 9.9 | 9.9 |
| Uniaxial multistage stretching ratio (times) |  | 1.5 | 1.4 | 1.4 | 1.4 | 1.5 | 1.2 | 1.5 |
| Total stretching ratio (times) |  | 14.5 | 13.0 | 13.6 | 13.7 | 14.0 | 11.4 | 14.5 |
| Thickness (mm) |  | 0.31 | 0.25 | 0.35 | 0.35 | 0.30 | 0.35 | 0.31 |
| Tensile elastic modulus (GPa) | MD | 9.5 | 9.8 | 9.7 | 10.9 | 10.9 | 6.6 | 10.5 |
|  | TD | 2.6 | 2.5 | 2.7 | 2.7 | 2.6 | 2.7 | 2.5 |
| Tensile strength (MPa) | MD | 514 | 496 | 510 | 540 | 512 | 419 | 553 |
|  | TD | 37 | 36 | 37 | 40 | 32 | 42 | 34 |
| Elongation rate at break (%) | MD | 10.9 | 10.4 | 11.7 | 10.7 | 10.3 | 15.4 | 10.5 |
|  | TD | 1.8 | 1.9 | 1.6 | 1.7 | 1.6 | 2.0 | 1.8 |
| Return angle after 90 degree bending (degrees) | bending in TD | 2 | 7 | 5 | 6 | 8 | 11 | 3 |
|  | bending in MD | 30 | 36 | 30 | 35 | 40 | 32 | 33 |
| Return angle after 180 degree bending (degrees) | bending in TD | 3 | 9 | 7 | 6 | 8 | 12 | 3 |
|  | bending in MD | 16 | 18 | 13 | 17 | 19 | 23 | 14 |

TABLE 2

|  |  | Example | | | | | | |
|---|---|---|---|---|---|---|---|---|
|  |  | 8 | 9 | 10 | 11 | 12 | 13 | 14 |
| Amount of olefin resin | High-density polyethylene resin 1 | 100 | 100 | 100 | 100 | 100 | 100 | 100 |
|  | High-density polyethylene resin 2 | — | — | — | — | — | — | — |
|  | Copolymer 1 | — | — | — | — | — | — | 25 |
|  | Copolymer 2 | 20 | 20 | 30 | — | — | — | — |
|  | Copolymer 3 | — | — | — | 3 | 10 | 25 | 5 |
| Rolling ratio (times) |  | 9.5 | 9.5 | 9.5 | 10.1 | 9.8 | 9.6 | 10.1 |
| Uniaxial multistage stretching ratio (times) |  | 1.1 | 1.5 | 1.5 | 1.4 | 1.4 | 1.4 | 1.4 |
| Total stretching ratio (times) |  | 10.3 | 14.0 | 14.0 | 13.8 | 13.7 | 13.3 | 13.9 |
| Thickness (mm) |  | 0.35 | 0.35 | 0.30 | 0.35 | 0.35 | 0.35 | 0.35 |
| Tensile elastic modulus (GPa) | MD | 6.1 | 10.5 | 10.4 | 11.0 | 10.7 | 11.1 | 10.2 |
|  | TD | 2.6 | 2.4 | 2.5 | 2.7 | 2.7 | 2.6 | 2.7 |
| Tensile strength (MPa) | MD | 407 | 498 | 537 | 484 | 516 | 525 | 495 |
|  | TD | 39 | 37 | 41 | 36 | 38 | 42 | 42 |
| Elongation rate at break (%) | MD | 20.0 | 11.7 | 10.8 | 10.0 | 10.8 | 10.3 | 10.4 |
|  | TD | 2.1 | 1.8 | 1.7 | 1.6 | 1.7 | 1.7 | 2.3 |
| Return angle after 90 degree bending (degrees) | bending in TD | 12 | 8 | 7 | 7 | 6 | 9 | 6 |
|  | bending in MD | 37 | 40 | 40 | 31 | 33 | 33 | 33 |

TABLE 2-continued

|  |  | Example | | | | | | |
|---|---|---|---|---|---|---|---|---|
|  |  | 8 | 9 | 10 | 11 | 12 | 13 | 14 |
| Return angle after 180 degree bending (degrees) | bending in TD | 12 | 9 | 8 | 7 | 7 | 9 | 7 |
|  | bending in MD | 25 | 21 | 22 | 19 | 17 | 16 | 13 |

TABLE 3

|  |  | Example | | | | | |
|---|---|---|---|---|---|---|---|
|  |  | 15 | 16 | 17 | 18 | 19 | 20 |
| Amount of olefin resin | High-density polyethylene resin 1 | — | — | 100 | 100 | 100 | 100 |
|  | High-density polyethylene resin 2 | 100 | 100 | — | — | — | — |
|  | Copolymer 1 | 20 | — | 25 | 25 | 25 | 10 |
|  | Copolymer 2 | — | 20 | — | — | — | — |
|  | Copolymer 3 | — | — | — | — | — | — |
|  | LLDPE | — | — | 5 | — | — | — |
|  | Elastomer | — | — | — | 5 | 2 | — |
|  | PP | — | — | — | — | 3 | — |
| Rolling ratio (times) |  | 9.9 | 10.2 | 9.9 | 9.9 | 9.4 | 9.5 |
| Uniaxial multistage stretching ratio (times) |  | 1.4 | 1.3 | 1.4 | 1.4 | 1.5 | — |
| Total stretching ratio (times) |  | 14.2 | 13.6 | 13.9 | 13.8 | 13.9 | 9.5 |
| Thickness (mm) |  | 0.45 | 0.45 | 0.36 | 0.36 | 0.36 | 0.41 |
| Tensile elastic modulus (GPa) | MD | 9.5 | 8.2 | 9.6 | 8.3 | 8.4 | 6.3 |
|  | TD | 2.6 | 2.5 | 2.5 | 2.1 | 2.2 | 2.9 |
| Tensile strength (MPa) | MD | 438 | 411 | 487 | 429 | 425 | 384 |
|  | TD | 38 | 37 | 38 | 36 | 37 | 44 |
| Elongation rate at break (%) | MD | 10.5 | 11.7 | 13.0 | 15.6 | 14.3 | 16.7 |
|  | TD | 2.0 | 2.0 | 2.4 | 3.5 | 2.9 | 2.4 |
| Return angle after 90 degree bending (degrees) | bending in TD | 2 | 7 | 10 | 13 | 12 | 14 |
|  | bending in MD | 32 | 35 | 38 | 40 | 40 | 38 |
| Return angle after 180 degree bending (degrees) | bending in TD | 4 | 8 | 10 | 13 | 13 | 10 |
|  | bending in MD | 20 | 22 | 21 | 24 | 24 | 23 |

TABLE 4

|  |  | Comparative Example | | | |
|---|---|---|---|---|---|
|  |  | 1 | 2 | 3 | 4 |
| Amount of olefin resin | High-density polyethylene resin 1 | 100 | 100 | — | — |
|  | High-density polyethylene resin 2 | — | — | 100 | 100 |
|  | Copolymer 1 | — | — | — | — |
|  | Copolymer 2 | — | — | — | — |
| Rolling ratio (times) |  | 9.6 | 10.0 | 10.6 | 10.3 |
| Uniaxial multistage stretching ratio (times) |  | — | 1.4 | — | 1.4 |
| Total stretching ratio (times) |  | 9.6 | 14.0 | 10.6 | 14.4 |
| Thickness (mm) |  | 0.43 | 0.43 | 0.42 | 0.42 |
| Tensile elastic modulus (GPa) | MD | 5.4 | 11.4 | 5.9 | 10.3 |
|  | TD | 2.8 | 2.6 | 2.7 | 2.5 |
| Tensile strength (MPa) | MD | 379 | 490 | 311 | 430 |
|  | TD | 44 | 35 | 40 | 35 |
| Elongation rate at break (%) | MD | 15.5 | 11.2 | 13.9 | 10.6 |
|  | TD | 1.9 | 1.6 | 2.0 | 1.9 |
| Return angle after 90 degree bending (degrees) | bending in TD | 20 | 5 | 18 | 6 |
|  | bending in MD | 47 | unmeasurable | 49 | unmeasurable |

TABLE 4-continued

| | | Comparative Example | | | |
|---|---|---|---|---|---|
| | | 1 | 2 | 3 | 4 |
| Return angle after 180 degree bending (degrees) | bending in TD | 18 | 7 | 16 | 7 |
| | bending in MD | 32 | un-measurable | 34 | un-measurable |

INDUSTRIAL APPLICABILITY

Since the shape retaining material of the present invention is excellent in mechanical strengths, such as anti-longitudinal tearing property, tensile elastic modulus, and tensile strength, and has less-directional shape retaining properties excellent in any direction, the material can be suitably used as a binding material used in place of a metal wire, a core material of a hat brim, a core material for shape retaining of a mask, an apron, a bag, and the like, a lid material for a container for instant noodles, etc., and a cutting blade for Saran Wrap (registered trademark). The material can also be suitably used in the form of a laminated sheet in which the material is laminated on paper, a synthetic resin film, and the like and a composite in which the material is laminated on a formed material.

REFERENCE SIGNS LIST

1: shape retaining material
X: MD (stretching direction)
Y: TD (direction orthogonal to the stretching direction)
θ: return angle after bending

The invention claimed is:

1. A shape retaining material, which is a fibrous, band-like, or sheet-like stretched formed material comprising 100 parts by weight of a high-density polyethylene resin having a weight-average molecular weight of 100,000 to 500,000 Daltons and a density of 0.945 to 0.960 g/cm3 and 3 to 50 parts by weight of an ethylene-α-olefin copolymer obtained by copolymerizing ethylene with an α-olefin having 4 to 10 carbon atoms, the copolymer having a density of 0.935 to 0.960 g/cm3, the difference in density between the copolymer and the high-density polyethylene resin being ±0.020 g/cm3 or less, wherein the material shows, after being bent at an angle of 180 degrees in TD, held in the bent state for 1 minute, released, and left for 5 minutes after the release, a return angle of 15 degrees or less; and shows, after being bent at an angle of 180 degrees in MD, held in the bent state for 1 minute, released, and left for 5 minutes after the release, a return angle of 25 degrees or less.

2. The shape retaining material according to claim 1, wherein the melt mass flow rate (MFR) of the high-density polyethylene resin is 0.20 to 0.60 g/10 min, the melt mass flow rate (MFR) of the ethylene-α-olefin copolymer is 0.30 to 0.70 g/10 min, and the difference in melt mass flow rate (MFR) between the ethylene-α-olefin copolymer and the high-density polyethylene resin is 0.10 g/10 min or less.

3. The shape retaining material according to claim 1, wherein, in the stretching direction (MD), the tensile elastic modulus is 5 to 15 GPa and the tensile strength is 400 to 600 MPa.

4. The shape retaining material according to claim 1, wherein the stretched formed material further contains 7 parts by weight or less of one or more kinds of resins selected from the group consisting of linear low-density polyethylene, thermoplastic olefin elastomers, and metallocene polypropylene resins.

5. A method for producing the shape retaining material wherein the material shows, after being bent at an angle of 180 degrees in TD, held in the bent state for 1 minute, released, and left for 5 minutes after the release, a return angle of 15 degrees or less; and shows, after being bent at an angle of 180 degrees in MD, held in the bent state for 1 minute, released, and left for 5 minutes after the release, a return angle of 25 degrees or less, comprising rolling, at a rolling ratio of 5 times or more, a linear, band-like, or sheet-like formed material comprising 100 parts by weight of a high-density polyethylene resin having a weight-average molecular weight of 100,000 to 500,000 Daltons and a density of 0.945 to 0.960 g/cm3 and 3 to 50 parts by weight of an ethylene-α-olefin copolymer obtained by copolymerizing ethylene with an α-olefin having 4 to 10 carbon atoms, the copolymer having a density of 0.935 to 0.960 g/cm3, the difference in density between the copolymer and the high-density polyethylene resin being ±0.020 g/cm3 or less.

6. A method for producing the shape retaining material wherein the material shows, after being bent at an angle of 180 degrees in TD, held in the bent state for 1 minute, released, and left for 5 minutes after the release, a return angle of 15 degrees or less; and shows, after being bent at an angle of 180 degrees in MD, held in the bent state for 1 minute, released, and left for 5 minutes after the release, a return angle of 25 degrees or less, comprising rolling the linear, band-like, or sheet-like formed material comprising 100 parts by weight of a high-density polyethylene resin having a weight-average molecular weight of 100,000 to 500,000 Daltons and a density of 0.945 to 0.960 g/cm3 and 3 to 50 parts by weight of an ethylene-α-olefin copolymer obtained by copolymerizing ethylene with an α-olefin having 4 to 10 carbon atoms, the copolymer having a density of 0.935 to 0.960 g/cm3, the difference in density between the copolymer and the high-density polyethylene resin being ±0.020 g/cm3 or less, and subsequently uniaxially stretching the rolled material at a total stretching ratio of 10 to 40 times.

7. The method for producing the shape retaining material according to claim 6, wherein the rolling ratio is 5 times or more.

8. The method for producing the shape retaining material according to claim 6, wherein the uniaxial stretching ratio is 1.1 times or more.

9. The method for producing the shape retaining material according to claim 7, wherein the uniaxial stretching ratio is 1.1 times or more.

* * * * *